United States Patent [19]

Yasui et al.

[11] 4,222,030

[45] Sep. 9, 1980

[54] ELECTRIC CONTROL CIRCUIT FOR SAFETY APPARATUS IN AUTOMOTIVE VEHICLES

[75] Inventors: Toshio Yasui, Obu; Motoharu Naito, Okazaki; Ken Asami, Nagoya, all of Japan

[73] Assignees: Nipondenso Co., Ltd., Kariya; Toyota Jidosha Kogyo Kabushiki Kaisha, Toyota, both of Japan

[21] Appl. No.: 940,447

[22] Filed: Sep. 7, 1978

[30] Foreign Application Priority Data

Sep. 8, 1977 [JP] Japan .................. 52-108310

[51] Int. Cl.[2] .......................................... B60R 21/08
[52] U.S. Cl. .................. 340/52 H; 180/274; 280/735
[58] Field of Search ............... 180/103 R, 103 A, 274; 280/734, 735; 320/1; 307/10 R, 64; 340/52 H

[56] References Cited

U.S. PATENT DOCUMENTS

| | | | |
|---|---|---|---|
| 3,437,902 | 4/1969 | Jones, Jr. .................................. | 320/1 |
| 3,629,816 | 12/1971 | Gillund ........................ | 180/103 A X |
| 3,871,472 | 3/1975 | Hosaka et al. .................... | 180/103 A |
| 3,943,428 | 3/1976 | Whidden ............................. | 320/1 X |

Primary Examiner—John J. Love
Assistant Examiner—Michael Mar
Attorney, Agent, or Firm—Cushman, Darby & Cushman

[57] ABSTRACT

An electric control circuit for a safety apparatus of an automotive vehicle comprises an electrically operated actuator connected in series with an electric power source through a normally open switch to actuate the safety apparatus upon closure of the switch and is provided with a storage condenser connected in parallel with the switch and actuator to supply electric energy to the actuator upon disconnection of a conductor between the power source and actuator. In the control circuit, a first diode is connected at its anode in series with the positive electrode of the power source and at its cathode in series with the positive electrode of the condenser to interrupt an electric current discharged from the condenser therethrough, and a second diode is connected at its cathode in series with the negative electrode of the power source and at its anode in series with the negative electrode of the condenser to interrupt a reverse electric current flowing therethrough.

5 Claims, 2 Drawing Figures

ELECTRIC CONTROL CIRCUIT FOR SAFETY APPARATUS IN AUTOMOTIVE VEHICLES

BACKGROUND OF THE INVENTION

The present invention relates to an electric control circuit for a safety apparatus adapted to be actuated by an electrically operated actuator, and moe particularly to an electric control circuit of the type in which a storage condenser is connected with a primary electric power source in the form of a vehicle battery to ensure supply of electric energy to the actuator even when electric energy from the primary power source is unavailable due to disconnection of a primary power supply circuit for the actuator in the occurrence of a vehicle collision.

In such an electric control circuit as noted above, the actuator is connected in series with the primary power source through a normally open switch, and the storage condenser is connected in parallel with the switch and actuator to be discharged through the actuator upon closure of the switch. In general, the vehicle battery is assembled within an engine room compartment, and the switch is mounted on the front bumper of the vehicle or a central portion of the vehicle chassis. Meanwhile, the actuator is housed within the safety apparatus located in the passenger compartment, and the storage condenser is housed within a sealed case located adjacent to the instrument panel of the vehicle. In the electric wiring of the control circuit, a number of conductors leading from the vehicle battery are connected at a long distance with the condenser, switch and actuator. If the conductors are shorted with the ground or another conductor in the occurrence of a vehicle collision, the condenser may not be discharged through the actuator, and the safety apparatus then remains inoperative. This reduces the reliability of the safety apparatus.

SUMMARY OF THE INVENTION

It is, therefore, a primary object of the present invention to provide an improved electric control circuit in which the storage condenser can be discharged through the actuator to operate the safety apparatus effectively, regardless of various disconnections or shorts in the conductors.

According to the present invention, there is provided an electric control circuit for a safety apparatus of an automotive vehicle, which control circuit comprises an electric power source, normally open switch means to be closed in the occurrence of a vehicle collision, electrically operated actuator means connected in series with the power source through the switch means to actuate the safety apparatus upon closure of the switch means, and a storage condenser connected in parallel with the switch means and the actuator means;

the improvement comprising:

a first electric element interposed between the positive electrodes of the power source and condenser for permitting an electric current from the power source to the condenser and the actuator means and interrupting an electric current discharged from the condenser therethrough; and a second electric element interposed between the negative electrodes of the power source and condenser for permitting an electric current flowing through the actuator means to the negative electrode of the power source and interrupting a reverse electric current flowing therethrough.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
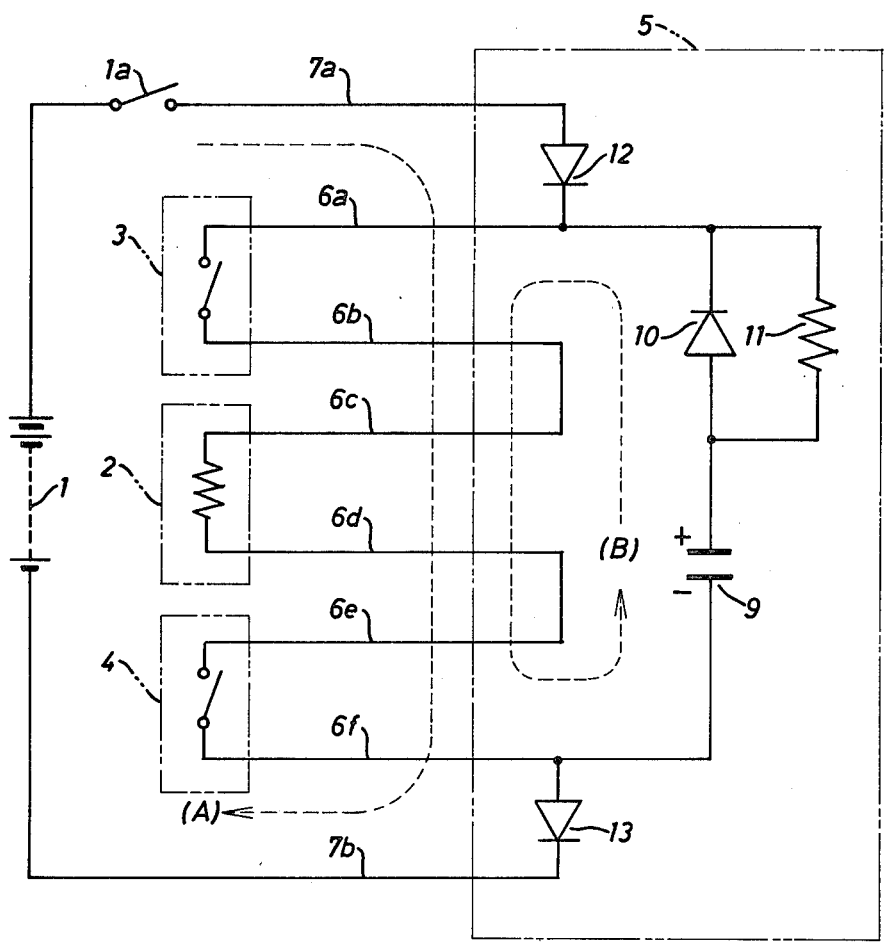
FIG. 1 is a schematic diagram of an electric control circuit in accordance with the present invention.

Now referring to FIG. 1 of the accompanying drawings, there is illustrated an electric control circuit in accordance with the present invention which is adapted to a safety apparatus for an automotive vehicle. The safety apparatus includes a conventional primer 2 to be fired electrically to supply fluid under pressure into an inflatable air bag. The electric control circuit comprises a primary electric power source in the form of a vehicle battery 1 and a pair of collision sensors 3, 4 in series with each other through the primer 2. The collision sensors 3, 4 are respectively in the form of a normally open switch to be closed upon deceleration of the vehicle in excess of a predetermined magnitude. The collision sensors 3, 4 are also mounted on the front bumper of the vehicle and a central portion of the vehicle chassis respectively. The collision sensor 3 is connected at its one end to the cathode of a diode 12 through a conductor 6a and at its other end to the primer 2 through conductors 6b and 6c. The anode of diode 12 is connected to the positive electrode of battery 1 through a conductor 7a and an ignition switch 1a. The collision sensor 4 is connected at its one end to the primer 2 through conductors 6e, 6d and at its other end to the anode of diode 13 through a conductor 6f. The cathode of diode 13 is connected to the negative electrode of battery 1 through a conductor 7b.

The electric control circuit further comprises a storage condenser 9 which is in the form of an aluminum electrolytic condenser of a large capacitance value. The storage condenser 9 is connected at its positive electrode to the cathode of diode 12 through a diode 10 and a resistor 11 and at its negative electrode to the anode of diode 13. In an actual practice of the embodiment, the whole component elements enclosed by an imaginary line 5 in FIG. 1 are assembled within a sealed case (not shown) to protect the component elements from damages in the occurrence of a vehicle collision.

When the ignition switch 1a is closed, the storage condenser 9 is charged with electric energy from the battery 1 through the diode 12, resistor 11 and diode 13. Upon closure of the sensors 3, 4, a primary discharge path A is formed by a closed circuit including the battery 1, diode 12, primer 2 and diode 13, and a secondary discharge path B is also formed by a closed circuit including the condenser 9, diode 10 and primer 2. Thus, the battery 1 and condenser 9 are discharged respectively through the primary and secondary discharge paths A, B to fire the primer 2.

The function of the respective diodes 12, 13 will now be described in detail under various conditions of shorts and/or disconnections of the conductors in the electric control circuit.

(1) In case the conductor 7a is shorted with one of the conductors 6d, 6e, 6f upon the occurrence of a vehicle collision, the diode 12 serves to block a discharged current therethrough from the condenser 9. Thus, the condenser 9 is discharged through the secondary discharge path B upon closure of the sensors 3, 4 to effectively fire the primer 2. In this instance, the battery 1 will be discharged through a short circuit excluding the primer 2.

(2) In case the conductor 7a is disconnected from batter 1 and shorted with one of the conductors 6d, 6e, 6f upon the occurrence of a vehicle collision, the diode 12 serves to block a discharged current therethrough from the condenser 9. Thus, the condenser 9 is discharged through the secondary discharge path B upon closure of the sensors 3, 4 to effectively fire the primer 2.

(3) In case the conductor 7b is shorted with one of the conductors 6a, 6b, 6c upon the occurrence of a vehicle collision, the diode 13 serves to block a discharged current therethrough from the condenser 9. Thus, the condenser 9 is discharged through the secondary discharge path B upon closure of the sensors 3, 4 to effectively fire the primer 2. In this instance, the battery 1 will be discharged through a short circuit excluding the primer 2.

(4) In case the conductor 7b is disconnected from the battery 1 and shorted with one of the conductors 6a, 6b, 6c upon the occurrence of a vehicle collision, the diode 13 serves to block a discharged current therethrough from the condenser 9. Thus, the condenser 9 is discharged through the secondary discharge path B to fire the primer 2.

(5) In case the conductor 7a is shorted with the conductor 7b upon the occurrence of a vehicle collision, one of the diodes 12, 13 serves to block a discharged current therethrough from the condenser 9. Thus, the condenser 9 is discharged through the secondary discharge path B to fire the primer 2.

(6) In case the conductor 7a is shorted with one of the conductors 6a, 6b, 6c upon the occurrence of a vehicle collision, the diode 13 serves to block a discharged current therethrough from the condenser 9 even if an electric voltage of the battery 1 becomes lower than a charged voltage of the condenser 9.

Figure 2:
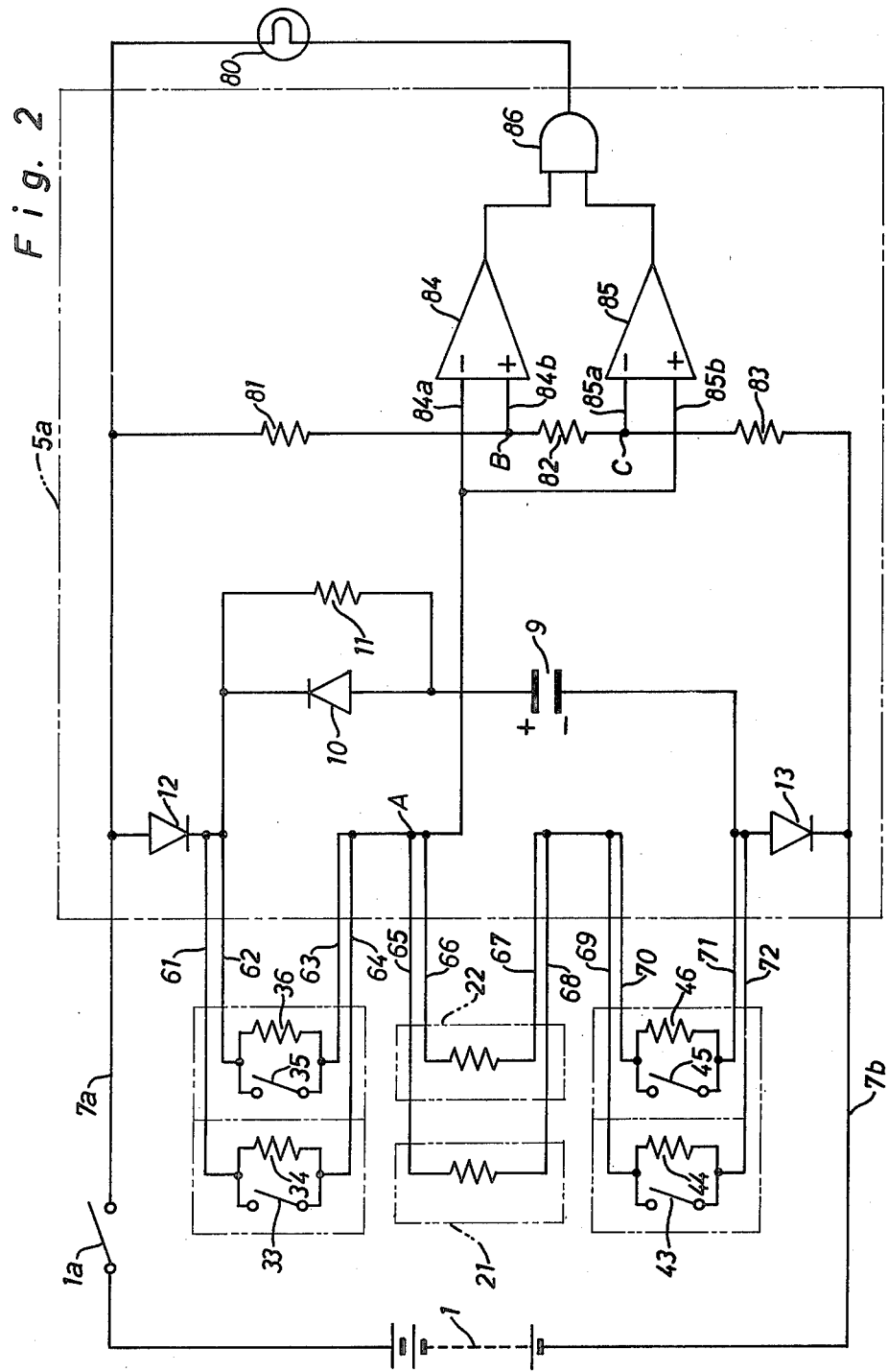
FIG. 2 is a schematic diagram of another embodiment of the electric control circuit.

FIG. 2 illustrates another embodiment of the electric control circuit which is adapted to another safety apparatus for an automotive vehicle. The safety apparatus includes a pair of conventional primers 21, 22 to be fired electrically to supply fluid under pressure into an inflatable air bag. The electric control circuit comprises four collision sensors 33, 35, 43, 45 which are respectively in the form of a normally open switch. The sensors 33, 43 are provided on the front bumper of the vehicle, and the remaining sensors 35, 45 are provided on a central portion of the vehicle chassis. Each of the sensors 33, 35, 43, 45 is adapted to be closed in response to the occurrence of a vehicle collision to fire the primers 21, 22.

The sensor 33 is in parallel with a resistor 34 and has one end connected to the cathode of diode 12 through a conductor 61 and the other end connected through a conductor 64 to the primers 21, 22 at a junction A. The sensor 35 is in parallel with a resistor 36 and has one end connected to the cathode of diode 12 through a conductor 62 and the other end connected to the junction A through a conductor 63. The diode 12 is connected at its anode to the positive electrode of vehicle battery 1 by way of the conductor 7a and ignition switch 1a. The sensor 43 is in parallel with a resistor 44 and has one end connected to the primers 21, 22 through conductors 69, 68, 67 and the other end connected to the anode of diode 13 through a conductor 72. The sensor 45 is in parallel with a resistor 46 and has one end connected to the primers 21, 22 through a conductor 70 and the conductors 68, 67 and the other end connected to the anode of diode 13 through a conductor 71. The diode 13 is connected at its cathode with the negative electrode of vehicle battery 1 through the conductor 7b. The storage condenser 9 described in the above embodiment is connected at its positive electrode to the cathode of diode 12 through the diode 10 and resistor 11 and at its negative electrode to the anode of diode 13. Additionally, each resistance value of the resistors 34, 36, 44, 46 is predetermined in such a manner that each electric current through primers 21, 22 is limited to a value below that required to fire each of the primers 21, 22.

When the ignition switch 1a is closed, the storage condenser 9 is charged with electric energy from the battery 1 through the diode 12, resistor 11 and diode 13. In this instance, the battery 1 is discharged through the diode 12, resistors 34, 36, primers 21, 22, resistors 44, 46 and diode 13 under opening of the sensors 33, 35, 43, 45 to generate an electric voltage $V_A$ at the junction A. Upon closure of the sensors 33, 35, 43, 45, the battery 1 is discharged through the diodes 12, 13 to fire the primers 21, 22, and the condenser 9 is also discharged through the diode 10 to fire the primers 21, 22.

The primers 21, 22 are also connected at junction A to a first input terminal 84a of a comparator 84 and a second input terminal 85b of a comparator 85 respectively. The comparator 84 is connected at its second input terminal 84b to a junction B between resistors 81, 82, while the comparator 85 is connected at its first input terminal 85a to a junction C between the resistor 82 and a resistor 83. The resistors 81, 82, 83 provide a voltage divider which is in series with the battery 1 through the ignition switch 1a to generate at its junctions B, C high and low divided constant voltages $V_B$, $V_C$. When the electric voltage $V_A$ at junction A is maintained at a value between the high and low constant voltages $V_B$, $V_C$, the comparators 84, 85 generate high level signals therefrom respectively. When the voltage $V_A$ becomes higher than the high constant voltage $V_B$, the comparators 84, 85 generate low and high level signals therefrom respectively. When the voltage $V_A$ becomes lower than the low constant voltage $V_C$, the comparators 84, 85 generate high and low level signals therefrom respectively.

An AND gate 86 has input terminals respectively connected to the output terminals of comparators 84, 85. AND gate 86 generates a high level signal therefrom when it receives the high level signals from comparators 84, 85 and also generates a low level signal therefrom when it receives one of the low level signals from comparators 84, 85. An indication lamp 80 is provided within a compartment of the vehicle and has one end connected to the positive electrode of battery 1 through the ignition switch 1a and the other end connected to an output terminal of AND gate 86. While the ignition switch 1a is closed, the indication lamp 80 is supplied with electric energy from the battery 1 in response to the low level signal from AND gate 80 to inform the operator of malfunction of the electric control circuit. Furthermore, in an actual practice of the embodiment, the whole component elements enclosed by an imaginary line 5a in FIG. 2 are assembled within a sealed case (not shown) to protect the component elements from damages in an occurrence of vehicle collision.

In operation, when the ignition switch 1a is closed to start the vehicle, the condenser 9 is charged, the primers 21, 22 generate an electric voltage $V_A$ at junction A, and the voltage divider generates the high and low constant voltages $V_B$, $V_C$ at junctions B, C. Then, the comparator 84 receives the voltage $V_A$ and high constant voltage $V_B$, and the comparator 85 receives the low constant voltage $V_C$ and voltage $V_A$.

In normal operation of the electric control circuit, the voltage $V_A$ is maintained at a value between the high and low constant voltages $V_B$, $V_C$. Then, the comparators 84, 85 generate high level signals therefrom respectively. Upon receiving the high level signals from comparators 84, 85, AND gate 86 generates therefrom a high level signal which is applied to the indication lamp 80. Thus, the indication lamp 80 may not be lit to inform the operator of nomality of the electric control circuit prior to or after start of the vehicle. Under such a condition, if one of the sensors 33, 35 and one of the sensors 43, 45 are respectively closed in response to the occurrence of a vehicle collision, each of the primers 21, 22 is energized by electric energy supplied from the power source 1 through the diodes 12, 13.

In case one of the conductors 61, 62 is disconnected or one of the sensors 43, 45 is shorted due to direct connection between the conductors 69, 72 or the conductors 70, 71, the voltage $V_A$ becomes lower than the low constant voltage $V_C$ at junction C. Then, the comparators 84, 85 generate high and low level signals therefrom respectively. Upon receiving the high and low level signals from the comparators 84, 85, AND gate 86 generates a low level signal which is applied to the indication lamp 80. Thus, the indication lamp 80 is lit to inform the operator of malfunction of the electric control circuit prior to or after start of the vehicle.

In case one of the conductors 69, 70 is disconnected or one of the sensors 33, 35 is shorted due to direct connection between the conductors 61, 64 or the conductors 62, 63, the voltage $V_A$ becomes higher than the high constant voltage at junction B. Then, the comparators 84, 85 generate low and high level signals therefrom respectively. Upon receiving the low and high level signals from the comparator 84, 85, AND gate 86 generates a low level signal therefrom. Thus, the indication lamp 80 is lit to inform the operator of malfunction of the electric control circuit.

Furthermore, the function of the respective diodes 12, 13 of this embodiment will now be described in detail under various conditions of shorts and/or disconnections of the conductors in the electric control circuit.

(a) In case the conductor 7a is shorted with one of the conductors 67-72 upon the occurrence of a vehicle collision, the diode 12 serves to block a discharged current therethrough from the condenser 9. Thus, the condenser 9 is discharged through the diode 10 upon closure of the sensors 33, 35, 43, 45 to effectively fire the primers 21, 22. In this instance, the battery 1 will be discharged through a short circuit excluding the primers 21, 22.

(b) In case the conductor 7a is disconnected from battery 1 and shorted with one of the conductors 67-72 upon the occurrence of a vehicle collision, the diode 12 serves to block a discharged current therethrough from the condenser 9. Thus, the condenser 9 is discharged through the diode 10 upon closure of the sensors 33, 35, 43, 45 to effectively fire the primers 21, 22.

(c) In case the conductor 7b is shorted with one of the conductors 61-66 upon the occurrence of a vehicle collision, the diode 13 serves to block a discharged current therethrough from the condenser 9. Thus, the condenser 9 is discharged through the diode 10 upon closure of the sensors 33, 35, 43, 45 to fire the primers 21, 22. In this instance, the battery 1 will be discharged through a short circuit excluding the primers 21, 22.

(d) In case the conductor 7b is disconnected from battery 1 and shorted with one of the conductors 61-66 upon the occurrence of a vehicle collision, the diode 13 serves to block a discharged current therethrough from the condenser 9. Thus, the condenser 9 is discharged to fire the primers 21, 22.

(e) In case the conductor 7a is shorted with one of the conductors 61-66 upon the occurrence of a vehicle collision, the diode 13 serves to block a discharged current therethrough from the condenser 9 even if a voltage of the battery 1 becomes lower than a charged voltage of the condenser 9.

Although the aluminum electrolytic condenser is used as the storage condenser 9 in the above-noted embodiments, it may be replaced with a secondary battery such as an alkaline battery, a lead battery, or the like.

For a practical use of the present invention, it is noted that the present invention may be adapted to various kinds of safety apparatus for automotive vehicles.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an electric control circuit for a safety apparatus of an automotive vehicle, which control circuit comprises an electric power source, normally open switch means to be closed in the occurrence of a vehicle collision, electrically operated actuator means connected in series with said power source through said switch means to actuate said safety apparatus upon closure of said switch means, and a storage condenser connected in parallel with said switch means and said actuator means;

the improvement comprising:

a first electric element interposed between the positive electrodes of said power source and condenser for permitting an electric current from said power source to said condenser and said actuator means and interrupting an electric current from being discharged from said condenser through said element; and a second electric element interposed between the negative electrodes of said power source and condenser for permitting an electric current to flow through said actuator means to the negative electrode of said power source and interrupting the flow of a reverse electric current.

2. An electric control circuit for a safety apparatus as claimed in claim 1, wherein said first electric element is a first diode connected at its anode in series with the positive electrode of said power source and connected at its cathode in series with the positive electrode of said condenser, and said second electric element is a second diode connected at its cathode in series with the negative electrode of said power source and connected at its anode in series with the negative electrode of said condenser.

3. An electric control circuit for a safety apparatus as claimed in claim 1, wherein said actuator means includes a plurality of electrically operated actuators in parallel with each other and in series with said switch means.

4. An electric control circuit for a safety apparatus as claimed in claim 1, further comprising:
   a resistor connected in parallel with said switch means;
   a constant voltage generator connected in series with said power source to generate a constant voltage therefrom;
   a comparator for comparing an electric voltage appearing at one end of said actuator means with the constant voltage to generate an output signal therefrom when the electric voltage of said actuator means becomes lower or higher than the constant voltage; and
   means for indicating a malfunction of said control circuit in response to the output signal from said comparator.

5. An electric control circuit for a safety apparatus as claimed in claim 1, further comprising:
   a resistor connected in parallel with said switch means;
   a constant voltage generator connected in series with said power source to generate low and high constant voltages therefrom;
   a first comparator for comparing an electric voltage appearing at one end of said actuator means with the low constant voltage to generate an output signal therefrom when the electric voltage of said actuator means becomes lower than the low constant voltage;
   a second comparator for comparing the electric voltage of said actuator means with the high constant voltage to generate an output signal therefrom when the electric voltage of said actuator means becomes higher than the high constant voltage; and
   means for indicating a malfunction of said control circuit in response to one of the output signals from said first and second comparators.

* * * * *